UNITED STATES PATENT OFFICE.

JOSEPH DITTO, OF NEW YORK, N. Y.

IMPROVED WATER-PROOF COATING FOR CLOTH, FELT, &c.

Specification forming part of Letters Patent No. 34,947, dated April 15, 1862.

*To all whom it may concern:*

Be it known that I, JOSEPH DITTO, of New York, in the county and State of New York, have invented, made, and applied to use a new and useful coating for woven fabrics, as machine-belting, hose, sheet-roofing, floor-cloths, blankets, covers, or goods of any nature that it may be advisable to render water-proof and flexible; and I do declare the following to be a full, clear, and correct description thereof.

The nature of my invention consists in forming a water-proof compound for the purposes above set forth by combining india-rubber with the residuum known as "residuary gum," which is separated from stearin when the latter is used in the manufacture of candles or candle-stock.

The proportions of india-rubber and residuary gum may be varied as may be deemed necessary to accommodate the compound to the nature of the material to be saturated or change of climate.

In manufacturing my improved compound the india-rubber and the residuary gum, in the proportions necessary, are placed in a suitable vessel and melted over a fire or by steam until they reach a fluid state. The material to be saturated is drawn through the compound and is passed through a pair of scrapers or rollers for the purpose of diffusing the compound as evenly as possible over the surface of the material.

When it is intended to use the material for roofing purposes it is covered with a sufficient quantity of ground mica, while for other purposes I employ pulverized soapstone or other suitable material. After the application of the mica, soapstone, or other suitable material the material is again passed through two or more rollers, in order that the soapstone, mica, or other material employed may be properly distributed and the surface made even and smooth.

Having thus described my invention, what I claim as new, and desire to secure by Letters Patent, is—

Combining india-rubber and the residuary gum separated from stearin to form a water-proof coating, for the purposes herein described.

JOSEPH DITTO.

In presence of—
 T. STUYVESANT,
 W. H. H. CHILDS.